United States Patent
Patterson

(10) Patent No.: US 8,103,588 B2
(45) Date of Patent: *Jan. 24, 2012

(54) SYSTEM AND METHOD FOR ACCOUNT LEVEL BLOCKING

(75) Inventor: Barbara Elizabeth Patterson, South San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/569,675

(22) Filed: Sep. 29, 2009

(65) Prior Publication Data

US 2010/0228671 A1   Sep. 9, 2010

Related U.S. Application Data

(60) Provisional application No. 61/157,530, filed on Mar. 4, 2009, provisional application No. 61/156,938, filed on Mar. 3, 2009.

(51) Int. Cl.
 *G06Q 40/00* (2006.01)
 *G06Q 20/00* (2006.01)
 *G06F 15/16* (2006.01)

(52) U.S. Cl. .......... 705/44; 705/16; 705/17; 705/39; 705/42; 705/43; 705/64; 705/65; 705/67; 705/70; 705/75; 705/76; 709/203; 709/219

(58) Field of Classification Search .......... 705/44, 705/16, 17, 39, 42, 43, 64, 65, 67, 70, 75, 705/76; 709/203, 219
See application file for complete search history.

(56) References Cited

U.S. PATENT DOCUMENTS

| 7,389,275 B2 * | 6/2008 | Kemper et al. ........... 705/64 |
| 2007/0100773 A1 | 5/2007 | Wallach |
| 2008/0183480 A1 | 7/2008 | Carlson et al. |
| 2008/0208748 A1 | 8/2008 | Ozment et al. |
| 2008/0243691 A1 | 10/2008 | Malcolm |

FOREIGN PATENT DOCUMENTS

| JP | 2008-065850 A | 3/2008 |
| KR | 10-2006-0096593 A | 9/2006 |

OTHER PUBLICATIONS

U.S. Appl. No. 12/568,484 filed Sep. 28, 2009.
Search/Examination Report dated Oct. 14, 2010 from International Patent Application No. PCT/US2010/025849, 9 pages.

* cited by examiner

*Primary Examiner* — Mary Cheung
*Assistant Examiner* — Daniel L Greene
(74) *Attorney, Agent, or Firm* — Kilpatrick, Townsend & Stockton LLP

(57) ABSTRACT

A system and method are disclosed. The method includes receiving, at a server computer, a transaction clearing request for a transaction, and then determining, using the server computer, if the transaction satisfies a stored blocking parameter. The method further includes allowing, using the server computer, the transaction clearing request if the transaction does not satisfy the stored blocking parameter, and denying, using the server computer, the transaction clearing request if the transaction satisfies the stored blocking parameter.

29 Claims, 13 Drawing Sheets

FIG. 9

| | | | | |
|---|---|---|---|---|
| Recent Activity: Chris M Bennett | | | | |
| Trans Date | Description | Payee Location | Category | Amount |
| 10/13/2008 | AMC Van Ness | San Francisco, CA | Dining & Entertainment | $21.00 |
| 10/13/2008 | Jeremy's | London, England | Clothing | $53.17 |
| 10/12/2008 | SF MUNI Court | San Francisco, CA | Other | $410.85 |
| 10/12/2008 | Stacks | San Francisco, CA | Dining & Entertainment | $29.93 |
| 10/12/2008 | Patxi's Chicago Pizza | San Francisco, CA | Dining & Entertainment | $33.58 |
| 10/11/2008 | Payment | San Francisco, CA | | +300.00 |
| 10/11/2008 Post Date: 10/10/2008 | Wallgreens # 4543 Transaction Number: 24164078289314103913 01 | San Francisco, CA ↘Location Options | Other ↘Category Options | $84.96 ↘Spend Options |
| 10/11/2008 | San Francisco Toyota Van | San Francisco, CA | Vehicle Expenses | $669.58 |
| 10/10/2008 | Sushi Hana | San Francisco, CA | Dining & Entertainment | $16.01 |
| 10/10/2008 | Wild Card | Cupertino, CA | Other | $30.12 |
| 10/09/2008 | USPS 0568743345 | Las Vegas, NV | Services & Merchandise | $14.04 |
| 10/09/2008 | Esperpento | Las Vegas, NV | Dining & Entertainment | $41.81 |

FIG. 13

SYSTEM AND METHOD FOR ACCOUNT LEVEL BLOCKING

CROSS-REFERENCES TO RELATED APPLICATIONS

The present application is a non-provisional application of and claims priority to U.S. Provisional Application No. 61/156,938, filed on Mar. 3, 2009, and U.S. Provisional Application No. 61/157,530, filed on Mar. 4, 2009. These applications are herein incorporated by reference in their entirety for all purposes.

BACKGROUND

In some cases, a consumer may want to restrict his usage of his account so that certain transactions are authorized and some are not. A typical example may be where a parent provides a credit card to a minor child. Another example may be where an employer provides a credit card to an employee for use in conducting transactions related to his employment. In such situations, the party responsible for payment may wish to limit the authorized user to a subset of transactions that is much more granular than just a credit limit as imposed by the card issuer. The user may set authorization controls whereby payment card transactions are blocked at the authorization stage of a transaction if certain blocking criteria are met. For example, the user may inform a central server that authorization requests for transactions associated with a payment card should be denied if the transactions are conducted out of the country.

Although such authorization controls are effective, there are many situations where a transaction may be cleared even though the payment transaction was not supposed to be. Clearing of a transaction is the process where a merchant or an acquirer (e.g., a bank with a merchant account) provides the appropriate issuer with information on the sale. This may include providing data required to identify the cardholder's account and providing the dollar amount of the sale. When the issuer gets this data, the issuer posts the amount of the sale as a draw against the cardholder's available credit and prepares to send payment to the acquirer. The next step after clearing is settlement which is the actual exchange of funds.

As an illustration of how an effort to control transaction authorizations through authorization request messages may not be fully effective to prevent transactions from proceeding, a merchant may have a "floor limit" of $100. This means that if a consumer makes a purchase transaction at the merchant for less than $100, the merchant can authorize the transaction without having to go to the issuer to determine whether or not the current transaction should be authorized (e.g., whether the consumer has sufficient funds to cover the transaction or has other restrictions on his account) according to controls that are set for authorization request messages. Thus, even though the user may want to prohibit the transaction at the merchant, an authorization request message is not sent to the issuer and the authorization controls that may reside between the merchant and the issuer may not be invoked. As a result, a transaction that should not have occurred may inadvertently occur.

Embodiments of the invention address these and other problems individually and collectively.

BRIEF SUMMARY

Embodiments of the invention are directed to methods, systems, and computer readable media for authorization and notification.

One embodiment of the invention is directed to a method that includes receiving, at a server computer, a transaction clearing request for a transaction, and then determining, using the server computer, if the transaction satisfies a stored blocking parameter. The method further includes allowing, using the server computer, the transaction clearing request if the transaction does not satisfy the stored blocking parameter, and denying, using the server computer, the transaction clearing request if the transaction satisfies the stored blocking parameter.

Another embodiment of the invention is directed to a method that includes receiving, at a server computer, a transaction clearing request for a transaction, and then determining, using the server computer, if the transaction satisfies a stored blocking notification parameter. The method further includes sending, using the server computer, a notification message if the transaction satisfies the stored blocking notification parameter.

Another embodiment of the invention is directed to a method that includes specifying, using a server computer, at least one blocking parameter wherein the blocking parameter is subsequently used to block a transaction that satisfies the blocking parameter. The method further includes receiving, at the server computer, a notification message when a transaction satisfies the blocking parameter.

Another embodiment of the invention is directed to a method that includes sending, using a computer apparatus, a transaction clearing request wherein a determination is made as to whether the transaction clearing request satisfies a stored blocking parameter. The method further includes receiving using the computer apparatus, a clearing return code if the transaction clearing request satisfies the stored blocking parameter.

Other embodiments of the invention are directed to computer readable media comprising code for performing the above-described methods as well as systems, apparatuses and devices that perform the methods and/or that use the computer readable media.

These and other embodiments of the invention are described in further detail below.

BRIEF DESCRIPTION OF THE DRAWINGS

FIGS. 7-13 show exemplary user interface screens according to an embodiment of the invention.

DETAILED DESCRIPTION

Embodiments of the present invention are directed to systems, apparatuses and methods for account level blocking of transactions at the clearing authorization stage (i.e., to prevent the transactions from being cleared when the sales drafts are being processed at the payment processing network) and optionally at the transaction authorization stage (i.e., to prevent the transaction from being approved).

Embodiments of the invention allow a consumer or other entity to set parameters to specify the types of payment transactions that should not be allowed to conclude. For example, the consumer may want to block all transactions made with his credit card outside the United States, at a particular type of merchant (e.g., liquor store) or via a certain payment channel (e.g., Internet purchases). After registration in a blocking system to specify his blocking parameters, any transactions made with his credit card outside the United States, in a liquor store, or on the Internet will be denied. These parameters can be changed at any time by the consumer. The consumer can also specify that he would like to receive notification when these types of transactions occur or when these types of transactions are blocked.

Embodiments of the invention also allow entities such as issuers of credit cards, debit cards, prepaid cards, and the like to specify blocking parameters for clearing level authorization and notification. When a transaction clearing request from a merchant meets one or more of the parameters specified by the issuer, an action specified by the issuer may occur. For example, an issuer may want to restrict transactions from clearing that relate to a specific card or set of cards that have been lost or stolen or block all recurring transactions from specified merchants. The issuer may also specify that upon the occurrence of a transaction clearing request for such a transaction, notification should be sent to the issuer's transaction system. If a merchant subsequently sends a transaction clearing request for a transaction that was not previously authorized by the card issuer, the transaction clearing request would be denied (i.e., the transaction is not allowed). Furthermore, a text or email message would be sent to the issuer indicating that a prohibited transaction had attempted to clear.

Additional details regarding embodiments of the invention are described below.

Figure 1:
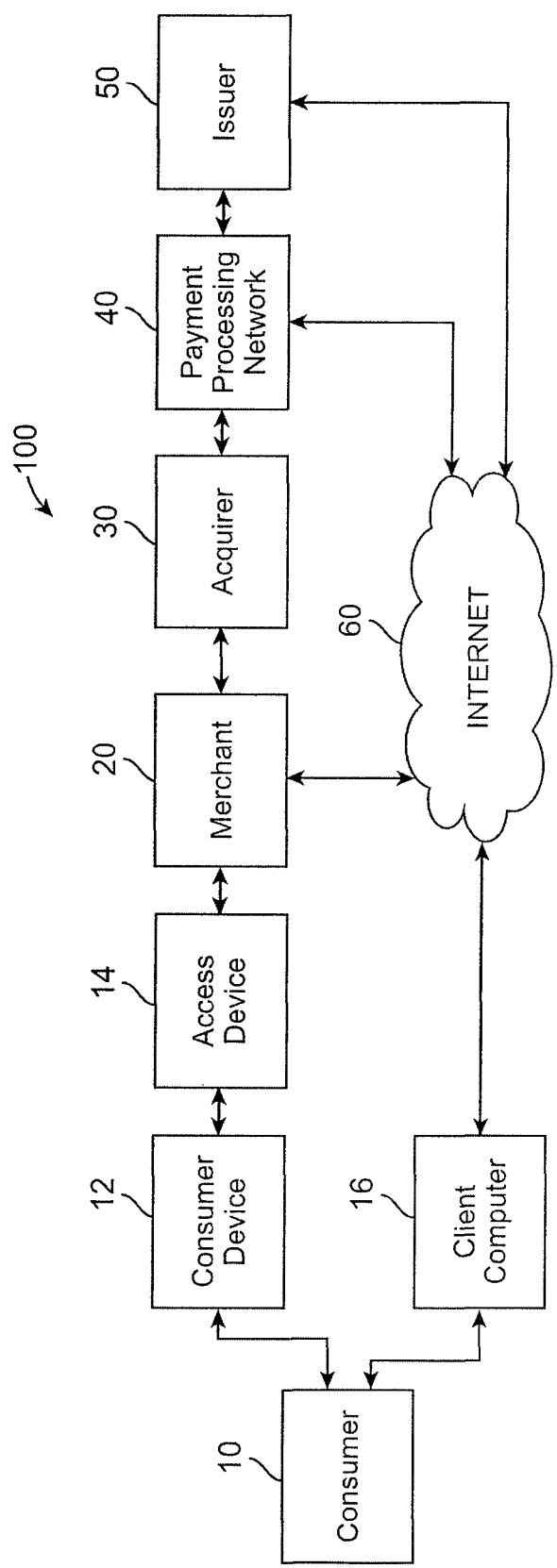
FIG. 1 shows a block diagram of a system according to an embodiment of the invention.

FIG. 1 shows a system that can be used for conducting a payment transaction. For simplicity of illustration, one consumer, one consumer device, one client computer, one access device, one merchant, one acquirer, and one issuer are shown. It is understood, however, that embodiments of the invention may include multiple consumers, consumer devices, client computers, access devices, merchants, acquirers, and issuers. In additional, some embodiments of the invention may include fewer than all of the components shown in FIG. 1. Also, the components in FIG. 1 may communicate via any suitable communication medium (including the Internet), using any suitable communication protocol.

The system 100 includes a consumer 10 which may be an individual, or an organization such as a business that is capable of purchasing goods or services. The consumer 10 may operate a client computer 16. The client computer 16 can be a desktop computer, a laptop computer, a wireless phone, a personal digital assistant (PDA), etc. It may operate using any suitable operating system including a Windowsill based operating system. The client computer may be used to interact with a merchant 20 (e.g., via a merchant website).

The consumer device 12 may be in any suitable form. For example, suitable consumer devices can be hand-held and compact so that they fit into a consumer's wallet and/or pocket (e.g., pocket-sized). They may include smart cards, ordinary credit or debit cards (with a magnetic strip and without a microprocessor), keychain devices (such as the Speedpass™ commercially available form Exxon-Mobil Corp.), etc. Other examples of portable consumer devices include cellular phones, PDAs, pagers, payment cards, security cards, access cards, smart media, transponders, and the like. The consumer devices can also be debit services (e.g., a debit card), credit devices (e.g., a credit card), or stored value devices (e.g., a stored value card).

The merchant 20 may be an individual or an organization such as a business that is capable of providing goods and services. The merchant 20 may have a computer apparatus (not shown). The computer apparatus may comprise a processor and a computer readable medium. The computer readable medium may comprise code or instructions for sending a transaction clearing request and receiving a clearing return code.

The merchant 20 may have one or more access devices 14. Suitable access devices include interfaces and may include point of sale (POS) devices, cellular phones, PDAs, personal computers (PCs), tablet PCs, handheld specialized readers, set-top boxes, electronic cash registers (ECR), automated teller machines (ATM), virtual cash registers (VCR), kiosks, security systems, access systems, and the like. They can interact with consumer devices. For example, a consumer 10 using a credit card to purchase a good or service can swipe it through an appropriate slot in the POS terminal. Alternatively the POS terminal may be a contactless reader, and the consumer device 12 may be a contactless device such as a contactless card. As another alternative, a consumer 10 may purchase a good or service via a merchant's website where the consumer enters the credit card information into the client computer 16 and clicks on a button to complete the purchase. The client computer 16 may be considered an access device.

The system 100 also includes an acquirer 30 associated with the merchant 20. The acquirer 30 may be in operative communication with an issuer 50 of the consumer device 12 via a payment processing network 40. The acquirer 30 is typically a bank that has a merchant account. The issuer 50 may also be a bank, but could also be a business entity such as a retail store. Some entities are both acquirers and issuers, and embodiments of the invention include such entities. The acquirer 30 and the issuer 50 may each have a server computer and a database associated with the server computer (not shown).

Figure 2:
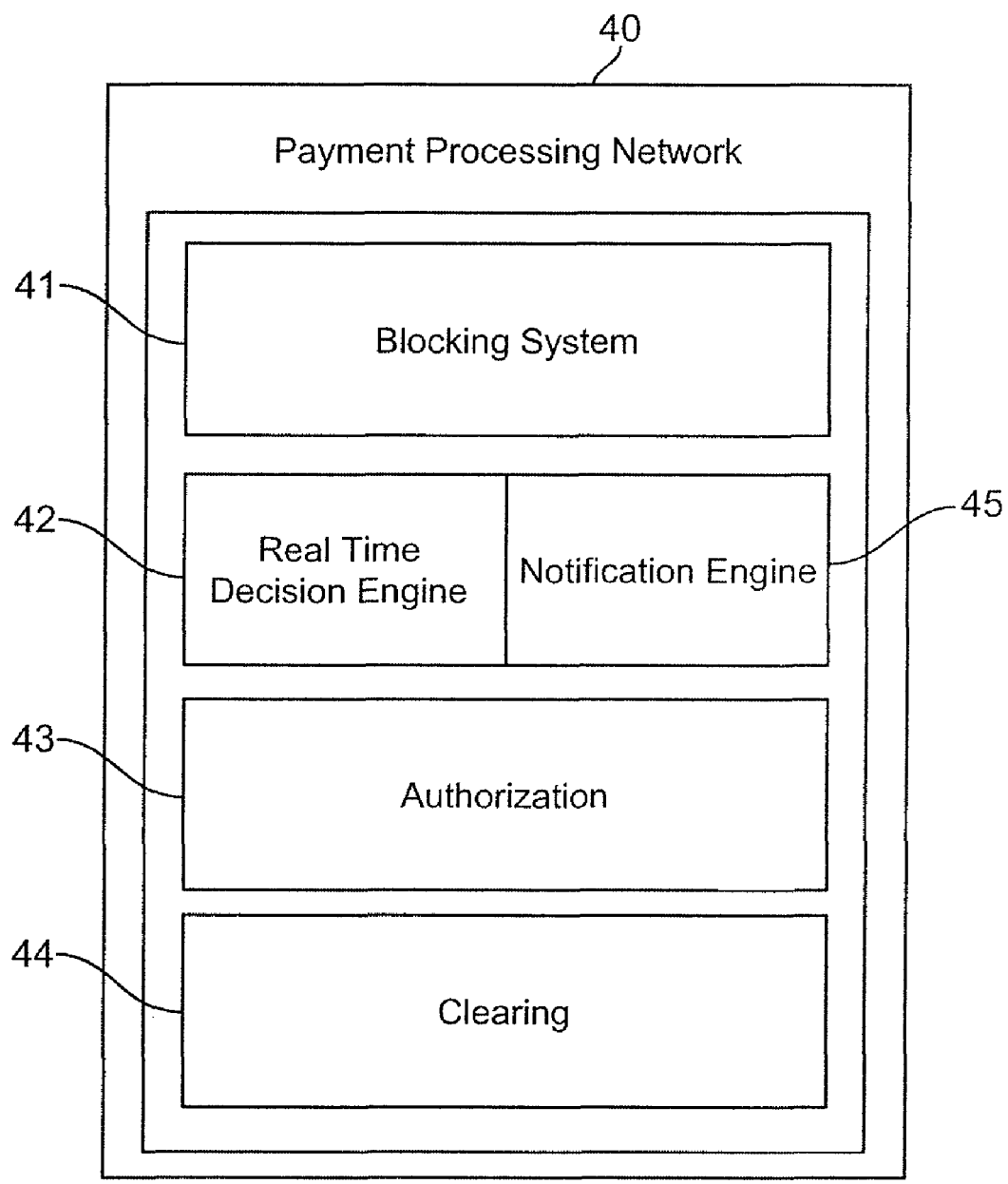
FIG. 2 shows a block diagram of a payment processing network according to an embodiment of the invention.

The payment processing network 40 is located between (in an operational sense) the acquirer 30 and the issuer 50. It may include data processing subsystems, networks, and operations used to support and deliver authorization services, exception file services, and clearing and settlement services. An exemplary payment processing network is shown in FIG. 2. The payment processing network 40 may include a blocking system 41 which allows for customizable level of control to restrict authorization and clearing of transactions. The blocking system 41 utilizes services from the real time decision engine 42 and the notification engine 45. The authorization system 43 processes authorization requests and the clearing system 44 performs clearing and settlement services.

For example, a payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 40 may use any suitable wired or wireless network, including the Internet. The payment processing network 40 may have a server computer and a database associated with the server computer (not shown). The server computer may comprise a processor and a computer readable medium. The computer readable medium may comprise code or instructions for receiving a transaction clearing request, determining if the transaction satisfies a stored blocking parameter, allowing or denying the transaction clearing request based on the blocking parameter, determining if the transaction satisfies a stored blocking notification parameter, and sending a notification if the transaction satisfies the stored blocking notification parameter.

Figure 3:
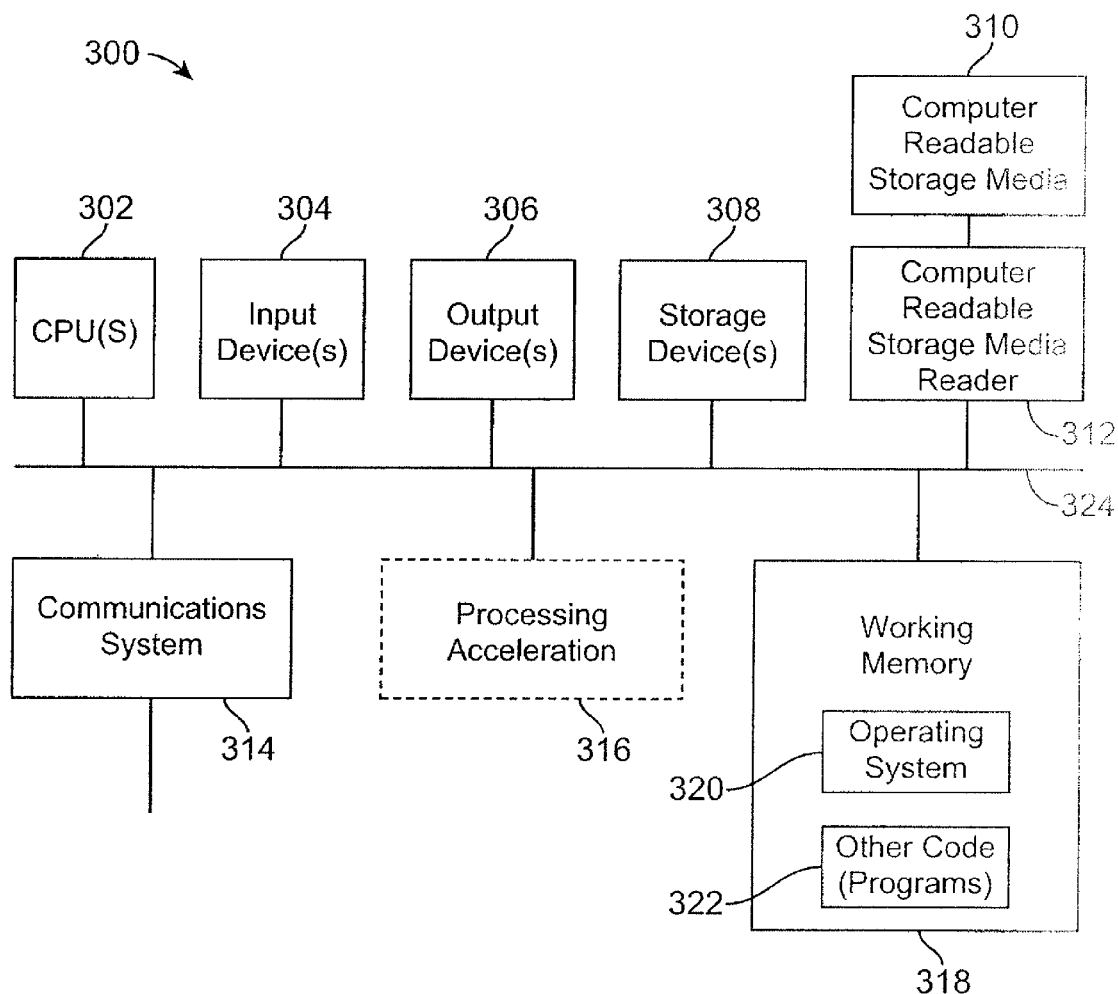
FIG. 3 illustrates an exemplary computer system in which various embodiments may be implemented.

FIG. 3 illustrates an exemplary computer system 300, in which various embodiments may be implemented. The system 300 may be used to implement any of the computer systems described above (e.g., client computer 16, a server computer at the payment processing network 40, a server computer at the issuer 50, a computer apparatus at the merchant 20, etc.). The computer system 300 is shown comprising hardware elements that may be electrically coupled via a bus 324. The hardware elements may include one or more central processing units (CPUs) 302, one or more input devices 304 (e.g., a mouse, a keyboard, etc.), and one or more output devices 306 (e.g., a display device, a printer, etc.). The computer system 300 may also include one or more storage devices 308. By way of example, the storage device(s) 308 can include devices such as disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 312, a communications system 314 (e.g., a modem, a network card (wireless or wired), an infra-red communication device, etc.), and working memory 318, which may include RAM and ROM devices as described above. In some embodiments, the computer system 300 may also include a processing acceleration unit 316, which can include a digital signal processor DSP, a special-purpose processor, and/or the like.

The computer-readable storage media reader 312 can further be connected to a computer-readable storage medium 310, together (and, optionally, in combination with storage device(s) 308) comprehensively representing remote, local, fixed, and/or removable storage devices plus storage media for temporarily and/or more permanently containing, storing, transmitting, and retrieving computer-readable information. The communications system 314 may permit data to be exchanged with the network and/or any other computer described above with respect to the system 300.

The computer system 300 may also comprise software elements, shown as being currently located within a working memory 318, including an operating system 320 and/or other code 322, such as an application program (which may be a client application, Web browser, mid-tier application, relational database management system (RDBMS), etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Figure 4:
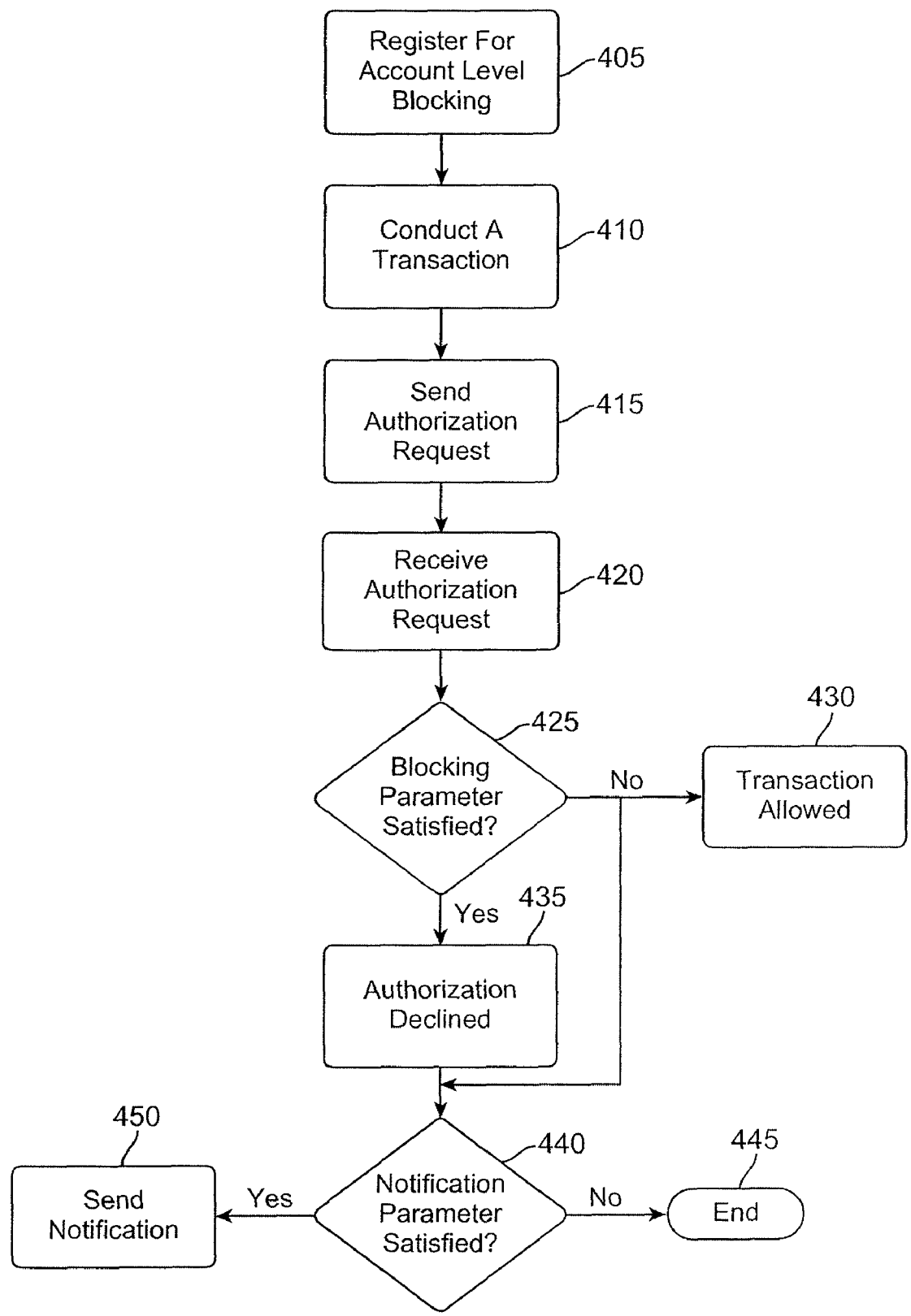
FIG. 4 shows a flowchart illustrating steps in a method according to an embodiment of the invention.

FIG. 4 shows a flowchart including a general method according to an embodiment of the invention. The method can be described with reference to the block diagrams in FIGS. 1 and 2 and the screen shots in FIGS. 6-13.

Figure 7:
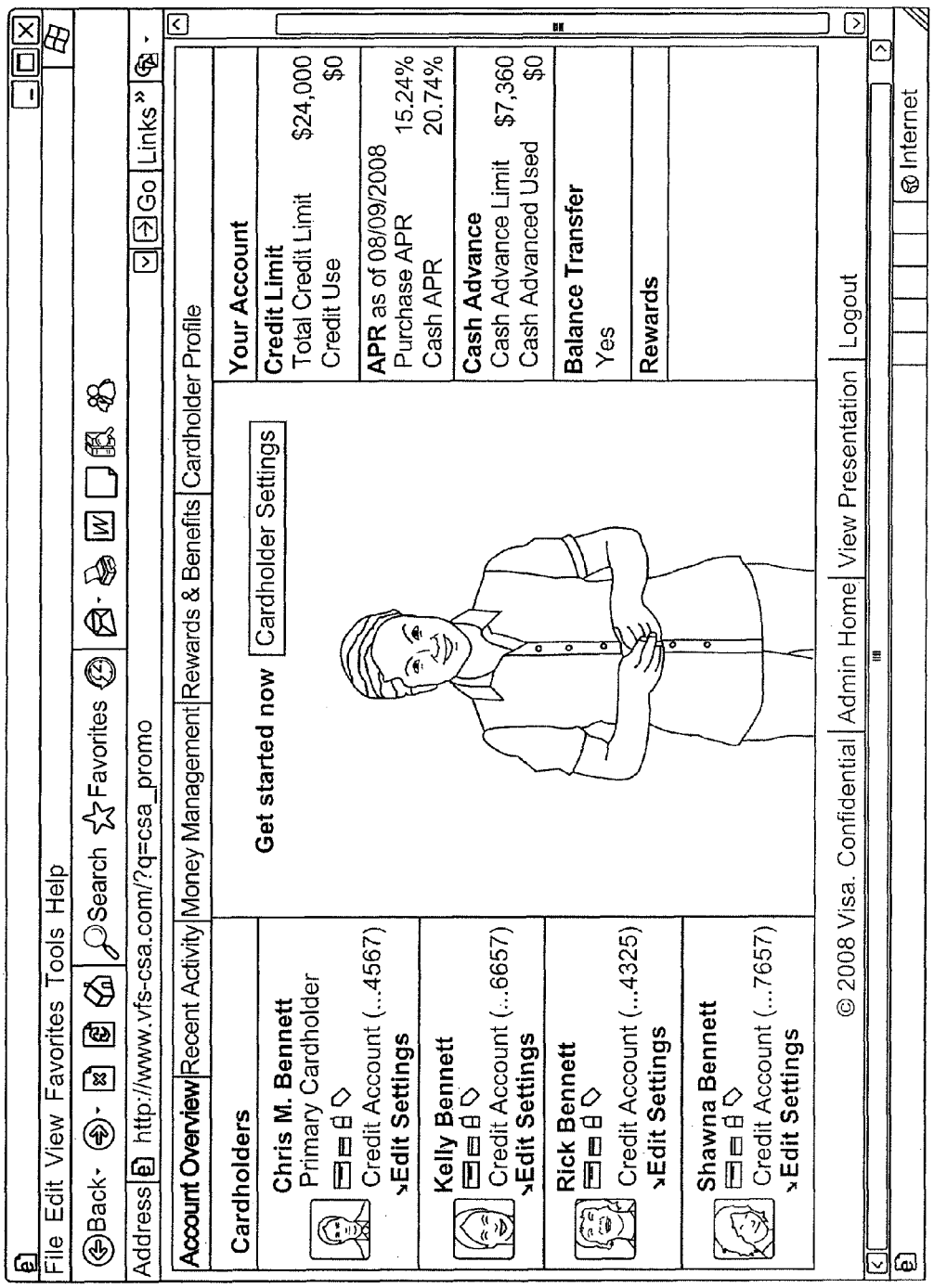

First, a consumer 10 may be presented with a webpage via a client computer 16 to register for account level blocking, as shown in FIG. 7 and in step 405 of FIG. 4. This webpage or web application may be hosted at the payment processing network 40 or the issuer 50. A consumer may also register in other manners such as by phone, email, SMS, etc. As part of the registration, the consumer may be asked to provide identifying information to the registration web server, in order to authenticate to the server that the consumer is in fact who he claims to be. Once the consumer has been authenticated, he may then specify blocking criteria to be associated with one or more accounts. The use of such blocking criteria may allow the consumer 10 to place restrictions on his account that are more specific than restrictions that may be placed by the issuer 50 of the account. It is useful for a consumer to be able to impose specific restrictions on his account.

Blocking criteria may include jurisdiction (e.g., countries or regions in which the transactions will not be allowed), merchant category code or merchant category group (e.g., type of business a merchant operates), merchant verification value (e.g., transactions that originate from a particular merchant, category of merchants, or list of merchants will not be allowed), payment channel (e.g., face-to-face, card not present, e-commerce), terminal ID (e.g., deny transactions that originate from specific terminals), transaction type (e.g., cash, POS purchase, quasi-cash, account funding transaction (AFT), original credit, payment), lost or stolen card (e.g., a "hotcard" list which will block all transactions from that card from being authorized), service code (e.g., a list of service codes from a card's magnetic stripe that should be blocked), recurring payment (e.g., stop all recurring transactions from specified merchants), single transaction limit, daily limit, or monthly limit. FIGS. 8-12 show exemplary user interface screens that may be provided to a consumer 10 to specify blocking parameters.

Figure 8:
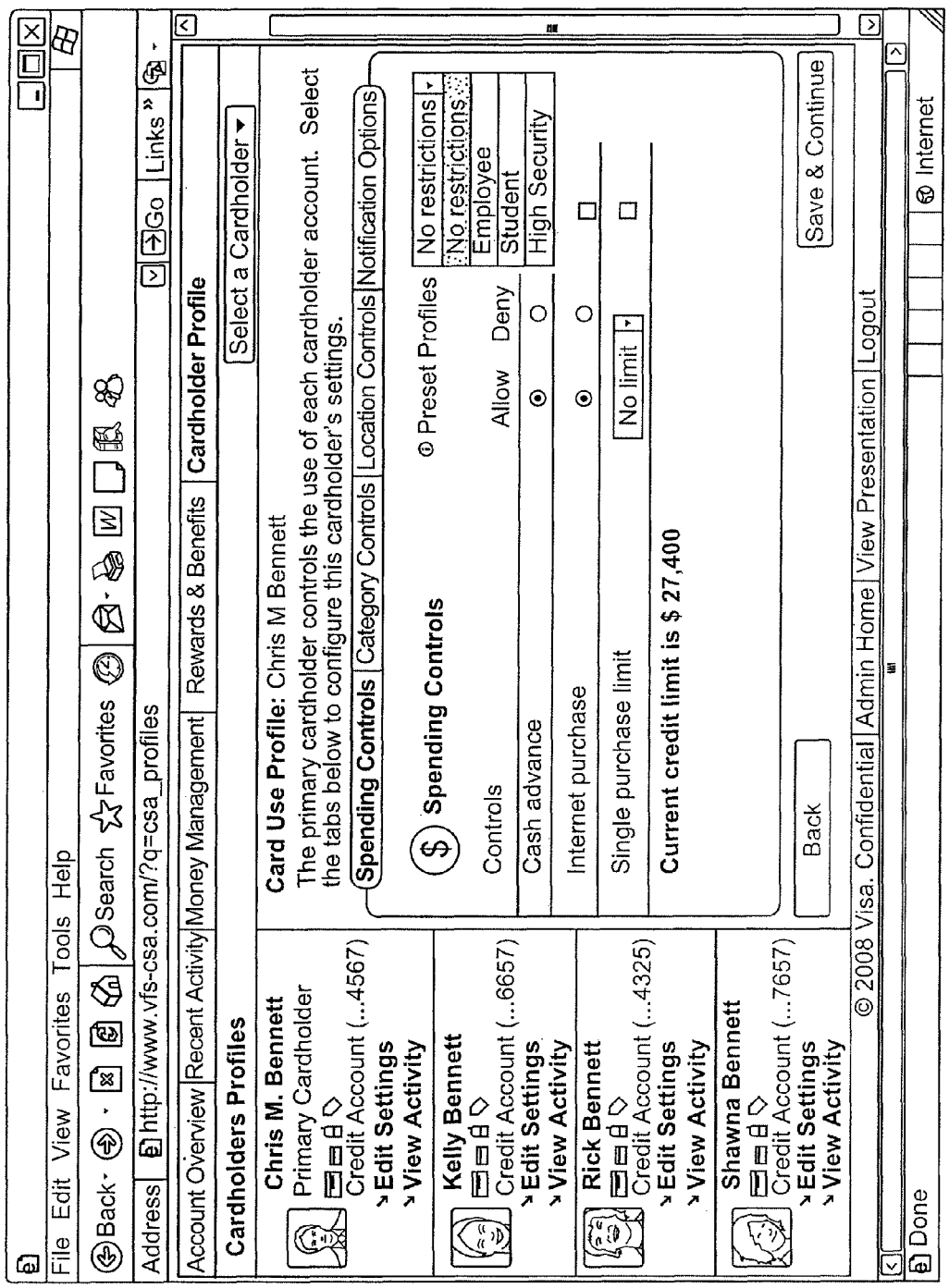

FIG. 8 shows an exemplary screen for setting spending control parameters. The consumer 10 may have the option to select preset profiles (e.g., employee, student, high security, etc.) which would automatically set authorization parameters to the most common setting for the type of profile selected. The use of a predetermined profile is advantageous, as it can save an account holder time and can provide suggestions on what types of transactions to block. For example, a "student" profile may preclude transactions conducted at merchants that sell liquor. The account holder may not think of this transaction blocking scenario and an exemplary profile may suggest this for him.

Additionally or alternatively, the consumer 10 has the ability to create a custom profile and designate authorization parameters for that profile. Any account subsequently designated with this profile would take on the same authorization parameters. The consumer 10 can designate as many cards to the same profile as appropriate. For example, a small business owner can set all of his employee cards as "employee."

A consumer 10 can choose to deny or allow cash advances for the account and Internet purchases. The consumer 10 could also set a single purchase limit which may provide for the maximum amount that may be spent in a single transaction (e.g., $5000). Another blocking criteria may be a daily limit, which limits that maximum that may be spent in a single day. Similarly, a monthly limit may also be provided.

Figure 9:
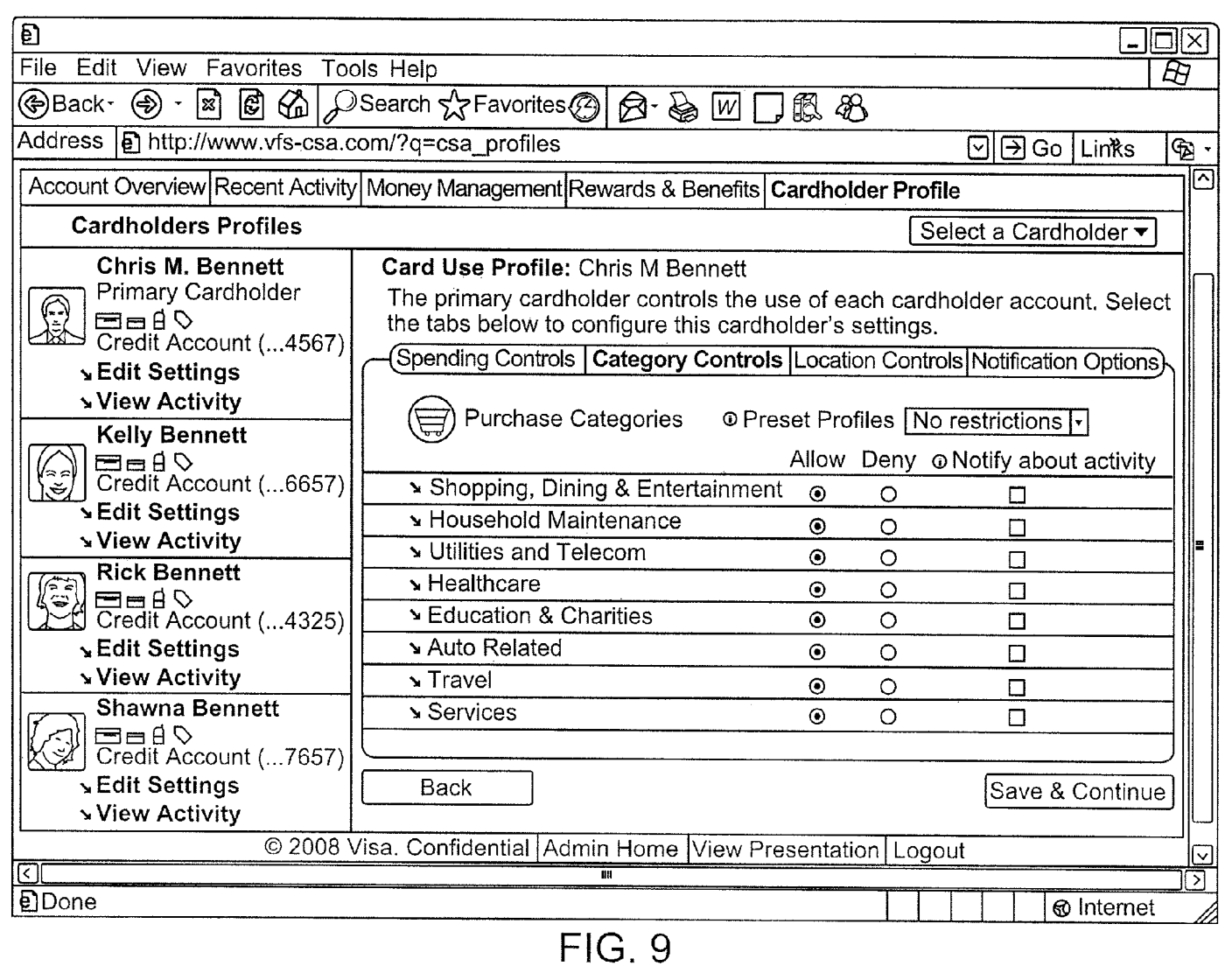

FIG. 9 shows an exemplary screen for setting category controls. A consumer 10 can choose to allow or deny a transaction relating to shopping, dining and entertainment, household maintenance, utilities and telecom, healthcare, education and charities, auto related, travel, services, etc. For example, a parent who has given a card to a minor child may wish to block purchases at merchants who sell adult oriented goods (e.g. liquor stores).

Another potential blocking criteria may be the channel used in a transaction. Some examples of channels can include merchant's brick and mortar stores, online purchases, Automated Teller Machine (ATM) transactions, and others. A consumer 10 may wish to block transactions from certain channels, while allowing them from other channels. Similarly to channel blocking, a consumer 10 may also wish to specify blocks based on transaction type. For example, purchase transactions may be allowed, while cash advance transactions may be denied.

Figure 10:
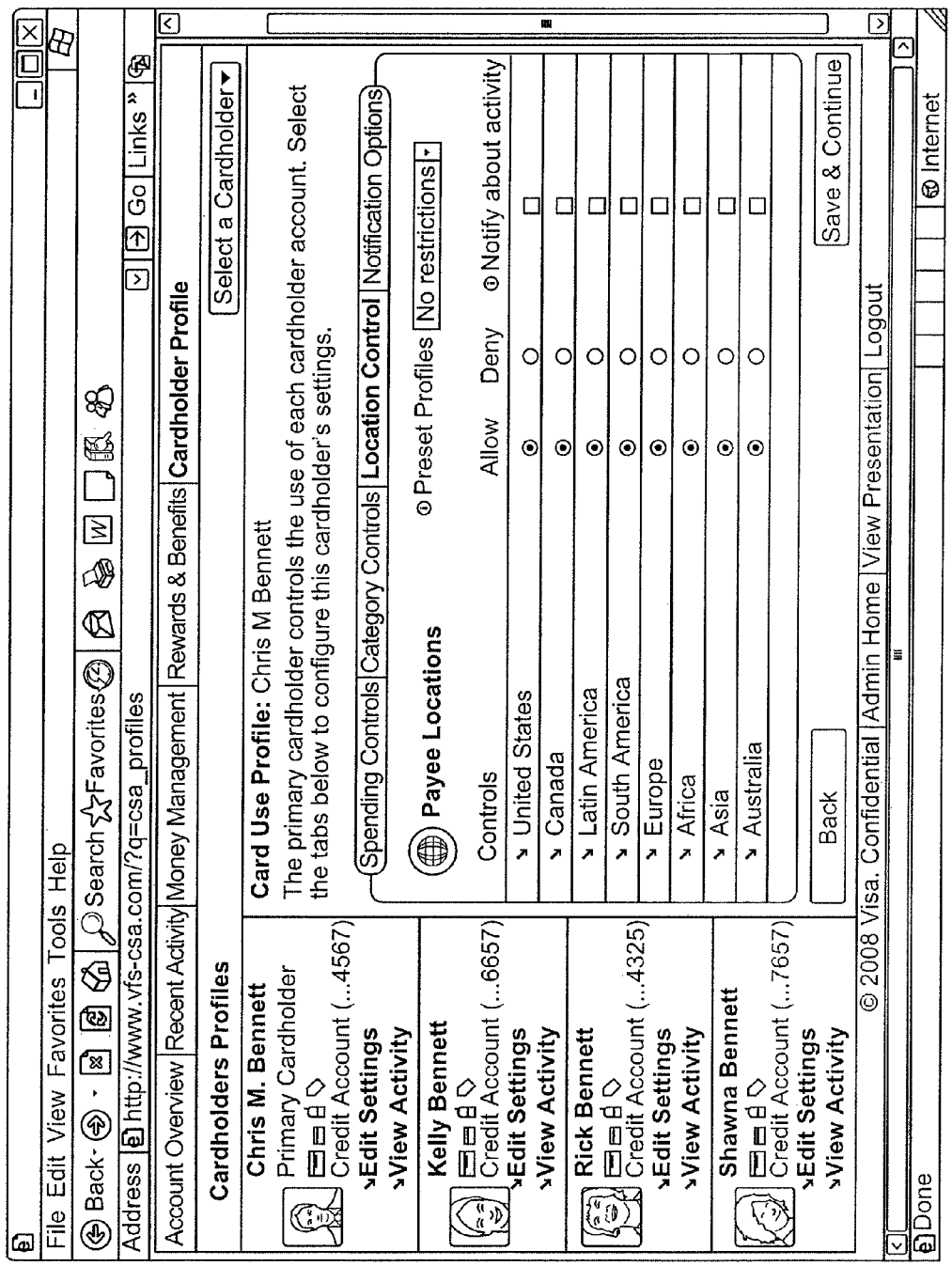
Figure 11:
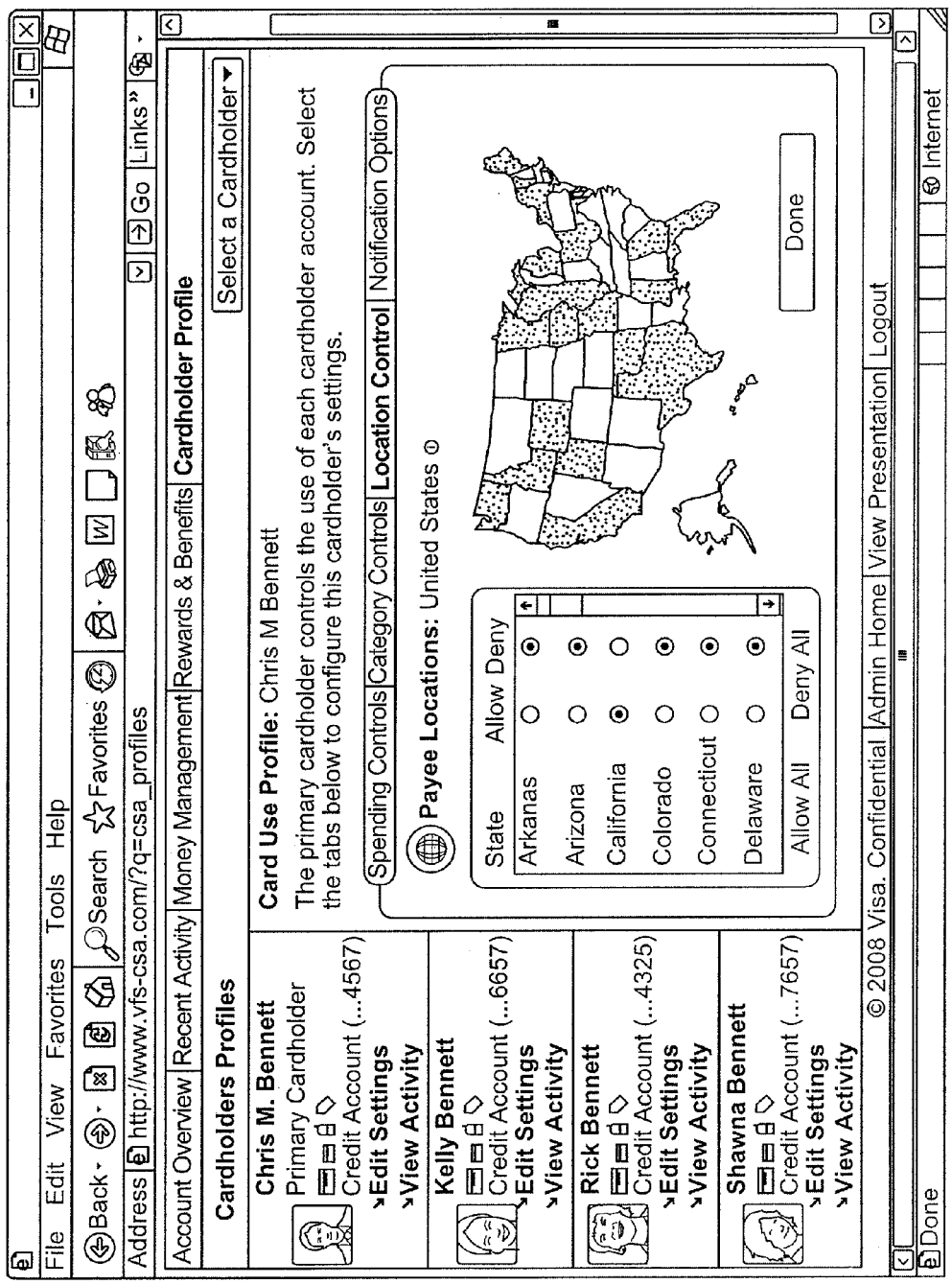

FIGS. 10 and 11 show exemplary screens for setting location controls so that a consumer 10 may block transaction based on geographic location. A consumer 10 can specify blocking parameters by broad categories (e.g., United States, Europe) or by specific states within a country (e.g., Arizona, Colorado). For example, the consumer 10 may wish to block transactions that occur outside of a specified list of states, or outside of a specified list of countries, or outside of the present country.

The above list of blocking criteria is not intended to be exhaustive. Embodiments of the present disclosure may make use of any blocking criteria as may be made available. Additionally, the blocking criteria as presented above may be used in any combination. For example, the consumer 10 may specify a monthly transaction limit along with a list of unacceptable merchant codes, while restricting purchases to the United States. If a transaction is attempted that violates any of the blocking criteria, the transaction may be disallowed.

Figure 12:
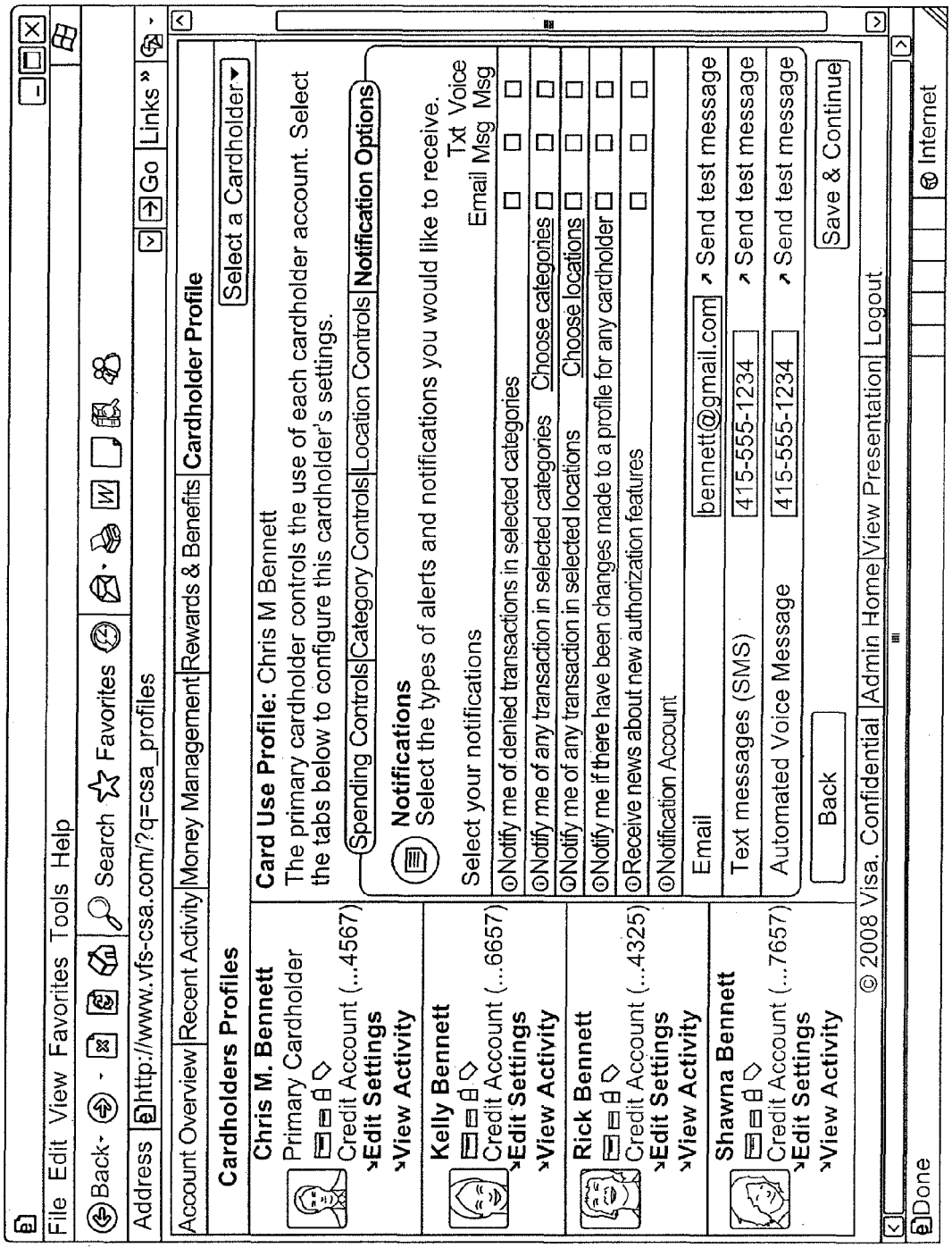

The criteria presented above for blocking transactions may also be used to provide the consumer responsible for the account with notifications. An exemplary webpage that may be presented to a consumer to set notification parameters is shown in FIG. 12. For example, a consumer 10 can specify a parameter to be notified when transactions are denied based on his blocking parameters. Notifications can include a text message to a mobile phone, an e-mail message, a phone call, a voice message or any other suitable form of notification. In some embodiments, instead of blocking a transaction, a notification message will be sent to the consumer 10. Such a notification can be useful in situations where the responsible party may not wish for the transaction to be denied, but wishes to be notified of the occurrence. For example, an employer may wish to control the maximum amount an employee may spend on a single transaction. If a blocking criteria based on a single transaction limit is set, transactions above that limit will always be denied. However, situations may arise where the employee must spend an amount that is outside of normal (e.g., the employee must pay a large vehicle repair bill for a company owned vehicle). By using notifications, instead of blocking, the employee will be on notice that his transactions are being monitored by the employer, while at the same time not restricting the employee's use of the card under exceptional circumstances.

In some embodiments, transaction blocking and notifications may be used together. For example, the cardholder may wish to set a monthly spending limit, and specify an account level block which will deny any transactions that would cause the monthly limit to be exceeded. At the same time, the account holder may wish to only be notified of any single transaction that exceeds a set limit, while not denying the transaction. Any combination of blocking and notifications using criteria such as has been described above are contemplated.

Once the consumer 10 has finished registration for account level blocking related to one or more accounts, the blocking parameters will be used by the payment processing network 40 via the blocking system 41 to determine whether or not a payment transaction using the account should be blocked (e.g., authorization for the payment transaction declined). A consumer 10 may return to the blocking system webpage to make any updates or modifications to blocking and notification parameters. A consumer can also view all of the recent activity for his account as shown in FIG. 13.

Returning to FIG. 4, in a typical purchase transaction, the consumer 10 purchases a good or service at the merchant 20 using a consumer device 12 such as a credit card (step 410). The consumer's consumer device 12 can interact with an access device 14 such as a POS (point of sale) terminal at the merchant 20. For example, the consumer 10 may take a credit card and may swipe it through an appropriate slot in the POS terminal. Alternatively, the POS terminal may be a contactless reader, and the consumer device 12 may be a contactless device such as a contactless card or a mobile phone with a contactless element.

An authorization request message is then forwarded to the acquirer 30. After receiving the authorization request message, the acquirer 30 sends the authorization request message to the payment processing network 40 (step 415). The authorization request messaged is then received by a server computer at the payment processing network (step 420). The payment processing network 40 via the blocking system 41 then determines whether the transaction satisfies a stored blocking parameter (step 425) by comparing the data elements available in the authorization request message against the blocking parameters specified by the consumer for types of transactions to be blocked.

For example, a consumer 10 may provide a credit card to his minor son. Using the example shown in FIG. 6, the consumer 10 may have specified a blocking parameter associated with a certain merchant category code (MCC) for liquor stores (e.g., 2356) indicating that he wants all transactions at liquor stores blocked for that account. He may also specify parameters indicating that all transactions that occur in Austria, Brazil, Canada, and Italy be blocked for that account. The minor son may then attempt to use the credit card to make a purchase a liquor store in France. Once the authorization request message is received at the server computer at the payment processing network 40, the payment processing network 40 via the blocking system 41 compares the information in the authorization request message to the blocking parameters selected by the consumer 10. For example, the blocking system 41 compares the acquirer country "France" with the blocked countries and determines that no blocking parameter applies. It then compares the MCC to the blocked MCCs and notes that the code 2356 for liquor stores matches the code on the blocked MCCs list. Thus, the transaction would not be allowed.

Returning to FIG. 4, If the blocking system 41 determines that a blocking parameter is satisfied (e.g., the transaction is occurring at a liquor store as in the example above), then an authorization is declined (step 435) and the payment processing network 40 forwards the authorization response message back to the acquirer 30. The acquirer 30 then sends the response message back to the merchant 20.

After the merchant 20 receives the authorization response message, the access device 14 at the merchant 20 may then provide the authorization response message for the consumer 10. The response message may be displayed by the POS terminal, the consumer device 12, or may be printed out on a receipt.

If the blocking system 41 determines that a blocking parameter is not satisfied, the transaction is allowed (step 430) and the payment processing network 40 then forwards the authorization request message to the issuer 50 of the consumer device 12.

After the issuer 50 receives the authorization request message, the issuer 50 sends an authorization response message back to the payment processing network 40 to indicate whether or not the current transaction is authorized (e.g., whether the account has sufficient credit or funds to cover the transaction). The payment processing network 40 then forwards the authorization response message back to the acquirer 30. The acquirer 30 then sends the response message back to the merchant 20.

After the merchant 20 receives the authorization response message, the access device 14 at the merchant 20 may then provide the authorization response message for the consumer 10. The response message may be displayed by the POS terminal, the consumer device 12, or may be printed out on a receipt.

Regardless of whether authorization is granted or declined, the blocking system 41 determines whether or not a notification parameter is met (step 440) by comparing the data elements available in the authorization request message against the notification parameters specified by the consumer for types of transactions he should be notified about. As described earlier, a consumer 10 may want to be notified about a particular type of transaction, whether or not the transaction was actually blocked.

If the blocking system 41 determines that a notification parameter is not satisfied, the process ends (step 445). If the blocking system 41 determines that a notification parameter is satisfied, then notification is sent to the consumer 10 (step 450) by means previously specified by the consumer 10 (e.g., though registration or in later updates made via a webpage). For example, a consumer 10 may receive notification via an SMS message on his mobile phone.

Figure 5:
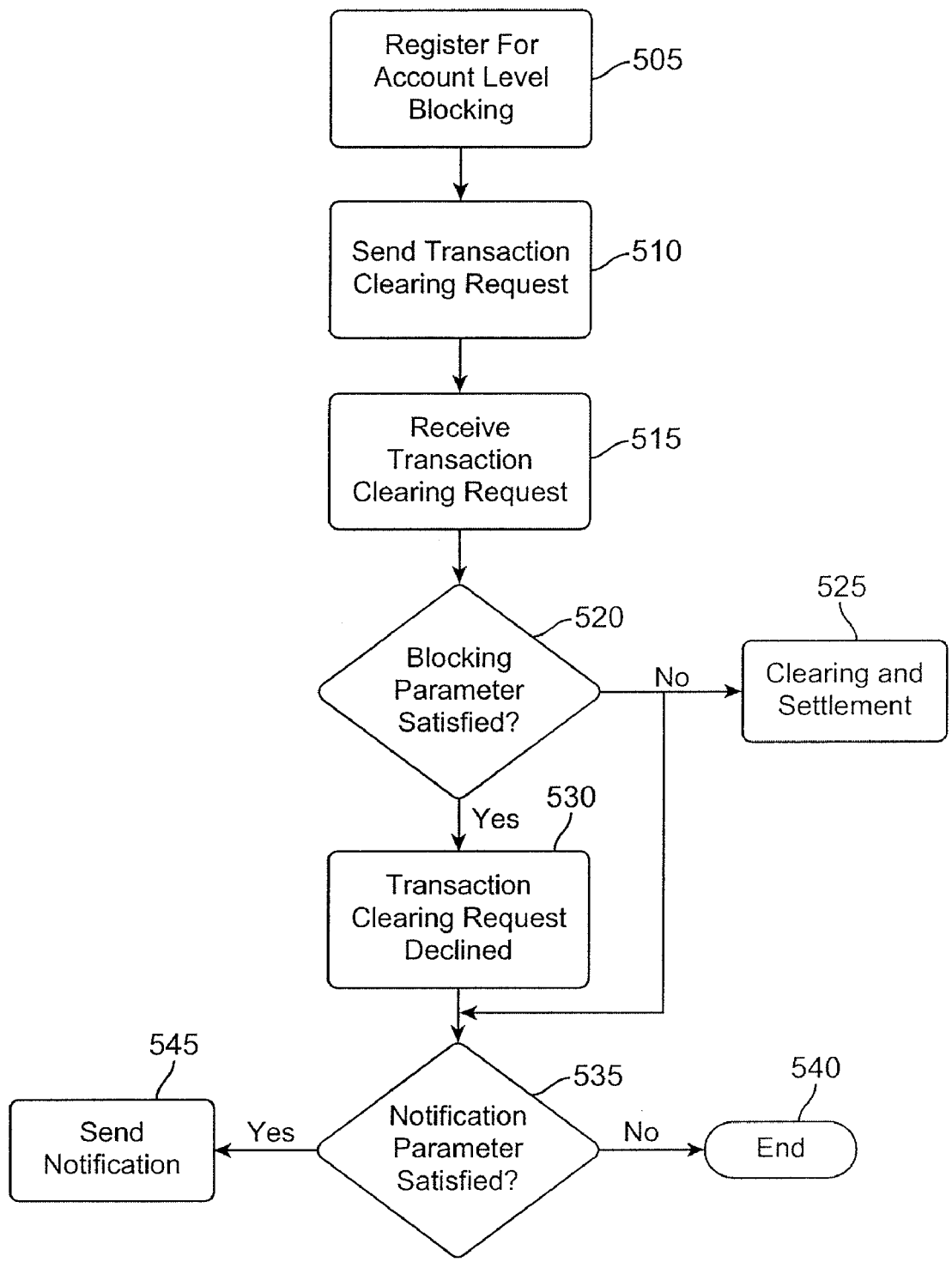
FIG. 5 shows a flowchart illustrating steps in a method according to an embodiment of the invention.
Figure 6:
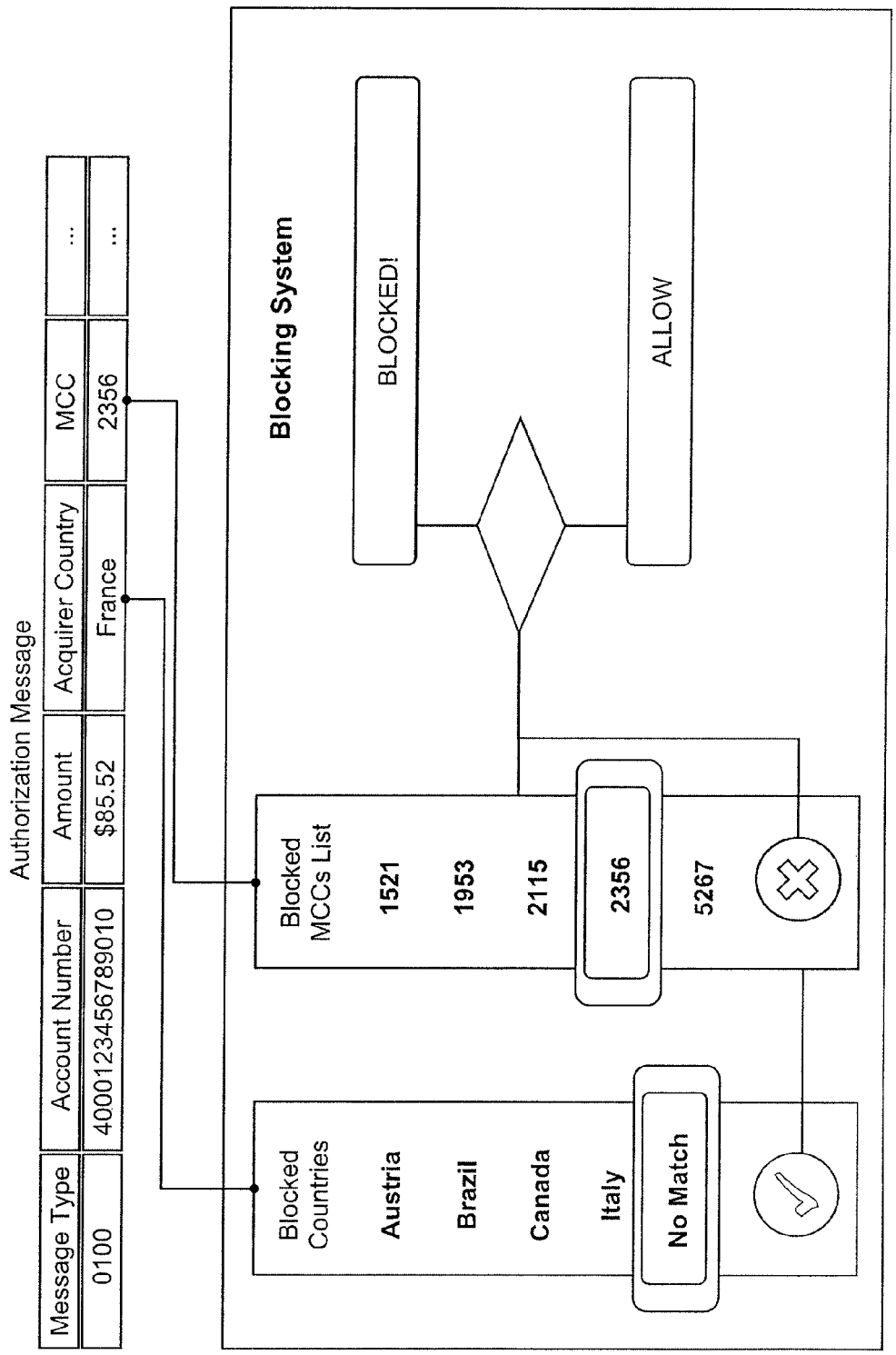
FIG. 6 shows a flowchart illustrating steps in a method according to an embodiment of the invention.

FIG. 5 shows a flowchart including a general method according to an embodiment of the invention. The method can be described with reference to the block diagrams in FIGS. 1 and 2.

First an issuer 50 registers for account level blocking (step 505). An issuer 50 may register via a website (similar to what was described above for a consumer registration), by email, phone, other means to specify blocking parameters to the payment processing network 40. An issuer 50 may also specify such parameters in a batch upload periodically (e.g., hourly, daily, weekly, monthly). For example, the issuer 50 may want to provide an updated list of lost or stolen cards at the end of the day directly to the blocking system 41 at the payment processing network 40.

Similar to the example described earlier in reference to FIG. 8, an issuer 50 may have the option to select preset profiles (e.g., high security) which would automatically set authorization parameters to the most common setting for the type of profile selected. The use of a predetermined profile is advantageous, as it can save an issuer time and can provide suggestions on what types of transactions to block. The issuer may not think of this transaction blocking scenario and an exemplary profile may suggest this for the issuer.

Additionally or alternatively, the issuer 50 has the ability to create a custom profile and designate authorization parameters for that profile. Any account subsequently designated with this profile would take on the same authorization parameters. The issuer 50 can designate as many accounts to the same profile as appropriate. For example, an issuer 50 can specify a different profile for each merchant category, for specific payment channels, or for a specific merchant.

As described above and in reference to FIGS. 8-12, blocking criteria may include jurisdiction (e.g., countries or regions in which the transactions will not be allowed), merchant category code or merchant category group (e.g., type of merchant from which transactions will not be allowed), merchant verification value (e.g., transactions that originate from a particular merchant, category of merchants, or list of merchants will not be allowed), payment channel (e.g., face-to-face, card not present, e-commerce), terminal ID (e.g., deny transactions that originate from specific terminals), transaction type (e.g., cash, POS purchase, quasi-cash, account funding transaction (AFT), original credit, payment), lost or stolen card (e.g., a "hotcard" list which will block all transactions from that card from being authorized), service code (e.g., a list of service codes from a card's magnetic stripe that should be blocked), recurring payment (e.g., stop all recurring transactions from specified merchants), single transaction limit, daily limit, or monthly limit.

The above list of blocking criteria is not intended to be exhaustive. Embodiments of the present disclosure may make use of any blocking criteria as may be made available. Additionally, the blocking criteria as presented above may be used in any combination. For example, the issuer 50 may specify a list of unacceptable merchant codes and restrict purchases to the United States. If a transaction is attempted that violates any of the blocking criteria, the transaction may be disallowed.

Any number of transactions may be conducted over the course of an hour, day, week, etc. at a particular merchant 20 or by a particular consumer 10 account. At the end of the day, a clearing and settlement process may be conducted by the payment processing network 40. After the issuer 50 has registered for account level blocking related to one or more accounts, the blocking parameters will be used by the payment processing network 40 via the blocking system 41 to determine whether or not a clearing transaction related to the account should be blocked (e.g., transaction clearing request declined).

First, a merchant 20 sends a transaction clearing request via a computer apparatus located at the merchant to the payment processing network 40 via an acquirer 30 (step 510). A server computer at the payment processing network 40 receives the transaction clearing request (step 515). The payment processing network 40 via the blocking system 41 determines whether or not a blocking parameter is satisfied (step 520) by comparing the data elements available in the transaction clearing request message (e.g., clearing record) against the blocking parameters specified by the issuer 50 for types of transactions to be blocked.

As described above, FIG. 6 shows an authorization message and how the payment processing network 40 via the blocking system 41 compares the data elements available in the authorization message with the blocking parameters specified by the consumer 10. In this embodiment, instead of an authorization message, the payment processing network 40 via the blocking system 41 is comparing a transaction clearing request with the blocking parameters. For example, an issuer 50 may have specified parameters to block transactions from clearing that originate in Austria, Brazil, Canada, and Italy. The issuer 50 may also specify that transactions should be blocked from clearing that have the merchant category codes 1521, 1953, 2115, 2356, and 5267. Finally, the issuer 50 may specify that transactions should be blocked from clearing that are in a list of lost or stolen cards (not shown).

In this example, a merchant 20 may send a transaction clearing request via a computer apparatus located at the merchant to the payment processing network 40 for clearing. A merchant 20 may send one request at a time or may send a batch of many requests. Once the transaction clearing request is received at the server computer at the payment processing network 40, the blocking system 41 compares the information in the transaction clearing request to the parameters specified by the issuer 50. For example, the blocking system 41 compares the acquirer country "France" with the blocked countries and determines that no blocking parameter applies. It then compares the MCC to the blocked MCCs and notes that the code 2356 matches the code on the blocked MCCs list. Thus, the transaction would not be allowed. The blocking system 41 would also compare the list of lost or stolen cards (not shown) and determine whether or not the account number matched a lost or stolen card.

If the blocking system 41 determines that a blocking parameter is satisfied (e.g., the MCC matches a code on the blocked MCC list as in the example above), then the transaction clearing request is declined (step 530) and the payment processing network 40 sends a transaction clearing response to the acquirer 30. The response may include an appropriate decline code indicating the reason the request was declined. The acquirer 30 then sends the response message back to the merchant 20.

If the blocking system 41 determines that a blocking parameter is not satisfied, the transaction clearing request is allowed and the payment processing network 40 facilitates settlement (step 525). Thus, the payment processing network 40 pays the merchant 20 (via the acquirer 30), debits the issuer account and sends the transaction to the issuer 50. The issuer 50 posts the transaction to the consumer account and sends a monthly statement to the consumer 10. The consumer 10 receives the statement from the issuer 50.

Regardless of whether the transaction clearing request is allowed or declined, the blocking system 41 next determines whether or not a blocking notification parameter is met (step 535). An issuer 50 may want to be notified about a particular type of transaction, whether or not the transaction was actually blocked.

If the blocking system 41 determines that a blocking parameter is not satisfied, the process ends (step 540). If the blocking system 41 determines that a blocking parameter is satisfied, then notification is sent to the issuer 50 (step 545) by means previously specified by the issuer 50 (e.g., though registration or in later updates made via a webpage or by bulk processing). For example, an issuer 50 may receive notification by email or directly to a system at the issuer 50 designed to receive such notifications.

Embodiments of the invention have a number of advantages. As described above there are many situations where a transaction may be cleared even though the payment transaction was not initially authorized by the issuer of the credit card, debit card, or the like (e.g., the merchant has a floor limit, the network is down, etc.). By allowing the issuer 50 to restrict the clearing of certain transactions, the problem of clearing transaction that were not initially authorized may be avoided.

Another advantage is the ability for the issuer, consumer or other entity to select preset or predetermined profiles or set customized profiles to set parameters common to specific types of use (e.g., transactions to block for a student's use versus an employee's use). The use of a predetermined profile is advantageous, as it can save an entity time and can provide suggestions on what types of transactions to block. For example, a "student" profile may preclude transactions conducted at merchants that sell liquor. The entity may not think of this transaction blocking scenario and an exemplary profile may suggest this for him. A custom or predetermined profile also makes it much easier for the issuers, consumer or other entities to specify parameters common to more than one account without having to specify the same parameters for each account individually which could be quite time consuming if, for example, an entity has 100 employees with accounts.

Embodiments of the invention are additionally advantageous to a consumer by allowing a consumer to restrict usage of his account so that certain transactions are authorized and some are not authorized. A consumer may have a large credit limit (e.g., $10,000) set by the issuer but may want to specify a lower spending limit to more accurately reflect his financial situation. Further, the consumer responsible for paying the account may not necessarily be the same as the person who is using the account (e.g., a parent providing a credit card to a minor child, and employer providing a credit card to an employee to used for business-related transactions). Embodiments of the invention allow the consumer who is responsible for paying for the account to put restrictions on the use by others for transactions using the account.

Yet another advantage is the ability for a consumer or issuer to specify parameters to be notified about a particular type of transaction, whether or not the transaction was actually blocked. As mentioned above, an employer may wish to control the maximum amount an employee may spend on a single transaction. If a blocking criteria based on a single transaction limit is set, transactions above that limit will always be denied. However, situations may arise where the employee must spend an amount that is outside of normal (e.g., the employee must pay a large vehicle repair bill for a company owned vehicle). By using notifications, instead of blocking, the employee will be on notice that his transactions are being monitored by the employer, while at the same time not restricting the employee's use of the card under exceptional circumstances. Similarly, an issuer may want to monitor transactions by certain merchants, payment channels, etc. for fraud or marketing purposes, but not necessarily block the transactions.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    receiving, at a server computer, a transaction clearing request for a transaction, wherein the transaction clearing request was sent by a merchant;
    determining, using the server computer, if the transaction satisfies a stored blocking parameter;
    allowing, using the server computer, the transaction clearing request if the transaction does not satisfy the stored blocking parameter; and
    denying, using the server computer, the transaction clearing request if the transaction satisfies the stored blocking parameter.

2. The method of claim 1 wherein the blocking parameter includes a jurisdiction, merchant category code, merchant category group, merchant verification value, payment channel, terminal ID, transaction type, lost card, stolen card, service code, recurring payment, single transaction limit, daily limit, or monthly limit.

3. The method of claim 1 wherein the blocking parameter is specified in a predetermined profile.

4. The method of claim 1 further comprising initially receiving, at the server computer, at least one blocking parameter.

5. The method of claim 1 further comprising sending, using the server computer, a clearing return code if the transaction satisfies the stored blocking parameter.

6. The method of claim 1 wherein the transaction was authorized during a transaction authorization process at the time the transaction was occurring.

7. The method of claim 1 wherein the transaction clearing request is received at the server computer within a batch of other transaction clearing requests.

8. The method of claim 1 wherein the blocking parameter is specified in a batch upload.

9. A non-transitory computer readable medium comprising computer readable program code embodied therein, said computer readable program code adapted to be executed by a processor for:
    receiving, at a server computer, a transaction clearing request for a transaction, wherein the transaction clearing request was sent by a merchant;
    determining, using the server computer, if the transaction satisfies a stored blocking parameter;
    allowing, using the server computer, the transaction clearing request if the transaction does not satisfy the stored blocking parameter; and
    denying, using the server computer, the transaction clearing request if the transaction satisfies the stored blocking parameter.

10. A server computer comprising a processor; and a non-transitory computer readable medium coupled to the processor, the non-transitory computer readable medium comprising computer readable program code embodied therein, said computer readable program code adapted to be executed by the processor for:
    receiving, at a server computer, a transaction clearing request for a transaction, wherein the transaction clearing request was sent by a merchant;
    determining, using the server computer, if the transaction satisfies a stored blocking parameter;
    allowing, using the server computer, the transaction clearing request if the transaction does not satisfy the stored blocking parameter; and
    denying, using the server computer, the transaction clearing request if the transaction satisfies the stored blocking parameter.

11. A method comprising:
    receiving, at a server computer, a transaction clearing request for a transaction, wherein the transaction clearing request was sent by a merchant;
    determining, using the server computer, if the transaction satisfies a stored blocking notification parameter; and
    sending, using the server computer, a notification message if the transaction satisfies the stored blocking notification parameter.

12. The method of claim 11 wherein the blocking notification parameter includes a jurisdiction, merchant category code, merchant category group, merchant verification value, payment channel, terminal ID, transaction type, lost card, stolen card, service code, recurring payment, single transaction limit, daily limit, or monthly limit.

13. The method of claim 11 wherein the blocking parameter is specified in a predetermined profile.

14. The method of claim 11 further comprising initially receiving at the server computer at least one blocking notification parameter.

15. The method of claim 11 wherein sending the notification message includes providing an email, SMS message, or a voice message.

16. The method of claim 11 wherein notification is sent to an issuer by email or directly to a system at the issuer.

17. A non-transitory computer readable medium comprising computer readable program code embodied therein, said computer readable program code adapted to be executed by a processor for:
    receiving, at a server computer, a transaction clearing request for a transaction, wherein the transaction clearing request was sent by a merchant;
    determining, using the server computer, if the transaction satisfies a stored blocking notification parameter; and
    sending, using the server computer, a notification message if the transaction satisfies the stored blocking notification parameter.

18. A server computer comprising a processor, and a non-transitory computer readable medium coupled to the processor, the non-transitory computer readable medium comprising computer readable program code embodied therein, said computer readable program code adapted to be executed by the processor for:
    receiving, at a server computer, a transaction clearing request for a transaction, wherein the transaction clearing request was sent by a merchant;

determining, using the server computer, if the transaction satisfies a stored blocking notification parameter; and sending, using the server computer, a notification message if the transaction satisfies the stored blocking notification parameter.

19. A method comprising;

specifying, using a server computer, at least one blocking parameter wherein the blocking parameter is subsequently used to block a transaction clearing request that satisfies the blocking parameter, wherein the transaction clearing request was sent by a merchant; and receiving, at the server computer, a notification message when a transaction satisfies the blocking parameter.

20. The method of claim 19 wherein the blocking parameter includes a jurisdiction, merchant category code, merchant category group, merchant verification value, payment channel, terminal ID, transaction type, lost card, stolen card, service code, recurring payment, single transaction limit, daily limit, or monthly limit.

21. The method of claim 19 further comprising creating a profile that specifies at least one blocking parameter.

22. The method of claim 19 wherein selecting at least one blocking parameter includes selecting a predetermined profile that specifies at least one blocking parameter.

23. A non-transitory computer readable medium comprising computer readable program code embodied therein, said computer readable program code adapted to be executed by a processor for:

specifying, using a server computer, at least one blocking parameter wherein the blocking parameter is subsequently used to block a transaction clearing request that satisfies the blocking parameter, wherein the transaction clearing request was sent by a merchant; and receiving, at the server computer, a notification message when a transaction satisfies the blocking parameter.

24. A server computer comprising a processor and a non-transitory computer readable medium coupled to the processor, the non-transitory computer readable medium comprising computer readable program code embodied therein, said computer readable program code adapted to be executed by the processor for:

specifying, using a server computer, at least one blocking parameter wherein the blocking parameter is subsequently used to block a transaction clearing request that satisfies the blocking parameter, wherein the transaction clearing request was sent by a merchant; and receiving, at the server computer, a notification message when a transaction satisfies the blocking parameter.

25. A method comprising:

sending, using a computer apparatus, a transaction clearing request wherein a determination is made as to whether the transaction clearing request satisfies a stored blocking parameter, wherein the transaction clearing request was sent by a merchant; and receiving, at the computer apparatus, a clearing return code if the transaction clearing request satisfies the stored blocking parameter.

26. The method of claim 25 further comprising initially authorizing a payment transaction.

27. The method of claim 25 wherein the blocking parameter includes a jurisdiction, merchant category code, merchant category group, merchant verification value, payment channel, terminal ID, transaction type, lost card, stolen card, service code, recurring payment, single transaction limit, daily limit, or monthly limit.

28. The method of claim 25 wherein the blocking parameter is specified in a predetermined profile.

29. The method of claim 1 wherein the stored blocking parameter is specified by an issuer.

* * * * *